United States Patent
Mainzer et al.

(10) Patent No.: US 10,767,803 B2
(45) Date of Patent: Sep. 8, 2020

(54) SPLIT CAP SAFETY PLUG

(71) Applicant: OPERATIONS TECHNOLOGY DEVELOPMENT, NFP, Des Plaines, IL (US)

(72) Inventors: Jeff Mainzer, Cary, IL (US); Travis Cottle, Glenview, IL (US)

(73) Assignee: OPERATIONS TECHNOLOGY DEVELOPMENT, NFP, Des Plaines, IL (US)

( * ) Notice: Subject to any disclaimer, the term of this patent is extended or adjusted under 35 U.S.C. 154(b) by 0 days.

(21) Appl. No.: 16/131,212

(22) Filed: Sep. 14, 2018

(65) Prior Publication Data

US 2019/0078719 A1    Mar. 14, 2019

Related U.S. Application Data

(60) Provisional application No. 62/558,614, filed on Sep. 14, 2017.

(51) Int. Cl.
| | |
|---|---|
| *F16L 55/132* | (2006.01) |
| *F16L 55/18* | (2006.01) |
| *B08B 9/04* | (2006.01) |
| *F16J 13/12* | (2006.01) |
| *F16J 15/06* | (2006.01) |
| *F16L 5/10* | (2006.01) |

(52) U.S. Cl.
CPC .............. *F16L 55/132* (2013.01); *B08B 9/04* (2013.01); *F16J 13/12* (2013.01); *F16J 15/067* (2013.01); *F16L 55/18* (2013.01); *F16L 5/10* (2013.01)

(58) Field of Classification Search
CPC . F16L 55/132; F16L 55/18; F16L 5/10; B08B 9/04; F16J 13/12; F16J 15/967
USPC .......................................................... 138/89
See application file for complete search history.

(56) References Cited

U.S. PATENT DOCUMENTS

| | | | | |
|---|---|---|---|---|
| 650,615 | A | * 5/1900 | Salomon ............ | B65D 51/1688 215/307 |
| 2,176,553 | A | 10/1939 | Walz et al. | |
| 3,821,969 | A | * 7/1974 | Sinko ...................... | B65D 59/02 138/89 |
| 5,038,829 | A | 8/1991 | Panella | |
| 5,678,720 | A | * 10/1997 | Van Melle ......... | B65D 43/0212 215/317 |
| 5,687,761 | A | 11/1997 | Langes | |

(Continued)

FOREIGN PATENT DOCUMENTS

| | | |
|---|---|---|
| DE | 3136239 A1 | 3/1983 |
| DE | 85 07 774.9 U1 | 4/1985 |

(Continued)

*Primary Examiner* — Craig M Schneider
*Assistant Examiner* — David R Deal
(74) *Attorney, Agent, or Firm* — Pauley Erickson & Kottis

(57) ABSTRACT

A safety plug for a pipe formed of two engageable plug halves each having a mateable face to seal together around a cable. An outer surface includes a plurality of steps corresponding with different pipe sizes for engagement within the pipe. The outer surface is threaded or includes a locking mechanism which moves a portion of the two engageable plug halves into physical engagement with threads of the pipe. The locking mechanism can include locking pins at each of the outer steps, and which are extended outward by a manual push button upon the plug being placed in a pipe.

22 Claims, 7 Drawing Sheets

(56) References Cited

U.S. PATENT DOCUMENTS

| | | | |
|---|---|---|---|
| 6,516,832 B1 | 2/2003 | Myers | |
| 8,286,275 B2 | 10/2012 | Kipp | |
| 9,593,792 B1 * | 3/2017 | Yoder | F16L 55/1152 |
| 9,709,346 B2 * | 7/2017 | Al-Otaibi | F16L 55/13 |
| 9,725,894 B2 | 8/2017 | Caux et al. | |
| 10,189,059 B2 * | 1/2019 | Mainzer | E03F 9/005 |
| 2002/0066490 A1 * | 6/2002 | Brewis | E21B 7/20 |
| | | | 138/89 |
| 2008/0066820 A1 * | 3/2008 | Williams | F16L 55/1141 |
| | | | 138/89 |
| 2008/0223473 A1 * | 9/2008 | Palmer | F16L 55/1157 |
| | | | 138/96 T |
| 2009/0095211 A1 * | 4/2009 | Johns | B01J 8/0015 |
| | | | 116/201 |
| 2009/0315275 A1 * | 12/2009 | Beele | F16L 5/10 |
| | | | 277/626 |
| 2011/0018210 A1 * | 1/2011 | Beele | F16L 5/10 |
| | | | 277/606 |
| 2011/0030132 A1 | 2/2011 | Biro | |
| 2015/0369689 A1 * | 12/2015 | Kotlyar | G01M 3/022 |
| | | | 73/49.8 |
| 2017/0051494 A1 | 2/2017 | Mainzer et al. | |

FOREIGN PATENT DOCUMENTS

| | | |
|---|---|---|
| DE | 10 2017 000 726 B3 | 6/2018 |
| EP | 1 662 630 A2 | 5/2006 |

\* cited by examiner

SPLIT CAP SAFETY PLUG

CROSS REFERENCE TO RELATED APPLICATION

This application claims the benefit of U.S. Provisional Patent Application, Ser. No. 62/558,614, filed on 14 Sep. 2017. The co-pending provisional application is hereby incorporated by reference herein in its entirety and is made a part hereof, including but not limited to those portions which specifically appear hereinafter.

BACKGROUND OF THE INVENTION

Field of the Invention

This invention relates generally to a split cap safety plug for use in sewer lines that require quick and simple capping around a cable.

Description of Related Art

When a plumber or similar professional is working in a sewer system clearing operation, occasionally a natural gas line, which was inadvertently installed into a working sewer, is struck by a power auger or other mechanical tool that causes natural gas to come back through the cleanout pipe into the building structure from which the operation is being performed. The plumber needs a device that can be quickly installed around the cable they were performing the sewer system clearing operation with and pushed into the opening of the cleanout Y-fitting in order to minimize or eliminate the blowing gas that is coming back into the building.

In addition, there are multiple sized cleanout Y-fittings that plumbers will be working with, and they often do not know what size cleanout Y-fitting they will be working with until they get into the building structure and see the cleanout fitting first hand. By having a three-in-one device that works for three different sized fittings according to embodiments of this invention, the plumber will be able to take this device into any situation and know that it will work for whichever cleanout they encounter without having to go back to his truck/car to get a different sized clean out cap.

SUMMARY OF THE INVENTION

The invention includes a split cap safety plug which can be used, for example, in place of a typical PVC clean out cap to seal a cleanout Y-fitting. The device of this invention is preferably usable with multiple sizes of pipe. The device preferably includes two halves that can be connected, such as via pins and/or a magnet, to form an outer diameter capable of mating with an internally threaded pipe to be sealed. When joined, the two halves create an inner diameter that will allow a cable of various sizes to pass through the device. Each half's inner diameter preferably includes a sealing material that will create a sealing surface around the previously mentioned cable.

Embodiments of this invention include a safety plug for a pipe, having two engageable plug halves each with a mateable face to seal around a cable. Each half includes on an outer surface a plurality of steps corresponding with different pipe sizes for engagement within the pipe. A locking mechanism moves a portion of the two engageable plug halves into physical engagement with threads of the pipe. The locking mechanism can include a push button that extends locking pins from each of the plurality of steps.

The invention further includes a safety plug for a pipe including two engageable plug halves, where each half includes an inner surface with a mateable face to seal around a cable, and an outer surface including a plurality of steps each corresponding with a different pipe size for engagement within a corresponding pipe. The safety plug further includes a locking mechanism with an extendable locking pin in combination with each of the plurality of steps, wherein the locking pin moves into physical engagement with threads of the pipe. The locking pin can be extended by a push button with a cam surface that pushes the pin outward.

The invention still further includes a method of plugging a pipe with a cable extending therethrough. The method includes: fitting two engageable plug halves together about the cable to form a safety plug; placing the safety plug within an end opening of the pipe; and extending a locking pin into physical engagement with threads of the pipe. In embodiments of this invention, extending the locking pin includes pressing a push button to move a cam surface against the locking pin to extend the locking pin in a direction at an angle to the cam surface movement.

BRIEF DESCRIPTION OF SEVERAL VIEWS OF THE DRAWINGS

Objects and features of this invention will be better understood from the following description taken in conjunction with the drawings.

DETAILED DESCRIPTION

FIGS. 1-14 show multiple views and embodiments of a device comprising a 3-in-1 split cap safety plug which can be used in place of a typical PVC clean out cap to seal a cleanout Y-fitting. Although disclosed as a 3-in-1 plug, the subject invention may include any number of steps permitting use with between 1 and a plurality of pipe sizes. The device preferably comprises two halves that can be connected via metal pins and/or a magnet or other connector. When joined, the two halves create an inner diameter that will allow a cable of various sizes to pass through the device. Each half's inner diameter includes a sealing material that will create a sealing surface around the previously mentioned cable.

Figure 1:
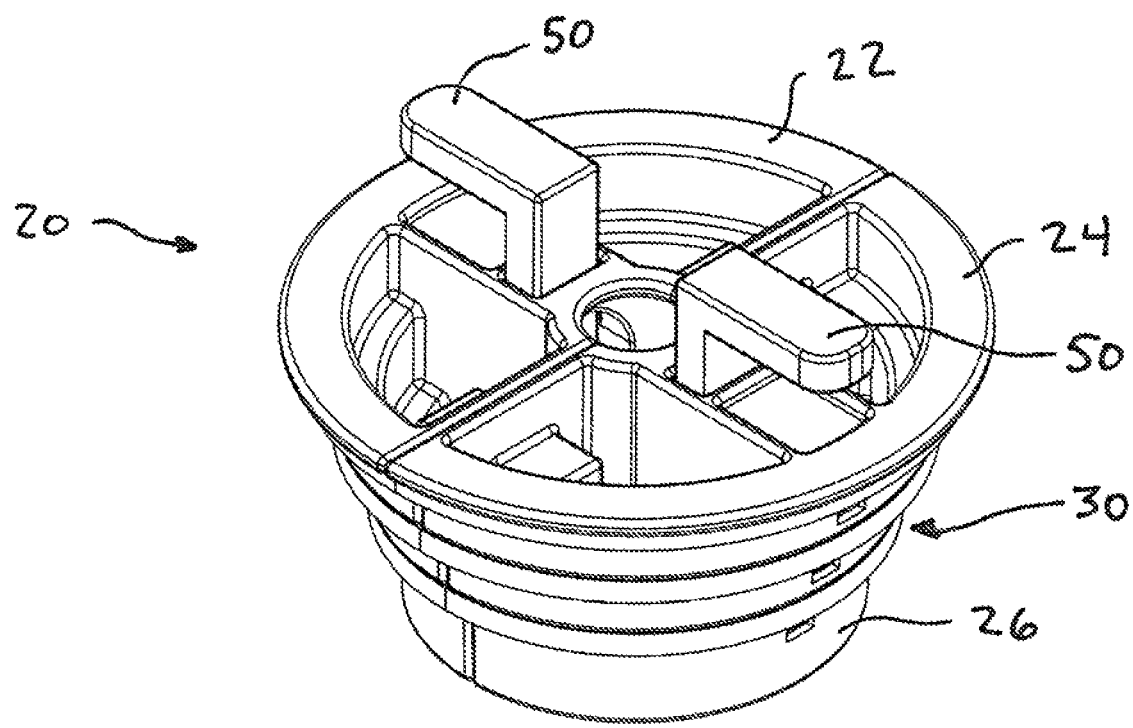
FIG. 1 is an isometric perspective view of a device according to one preferred embodiment of this invention.
Figure 2:
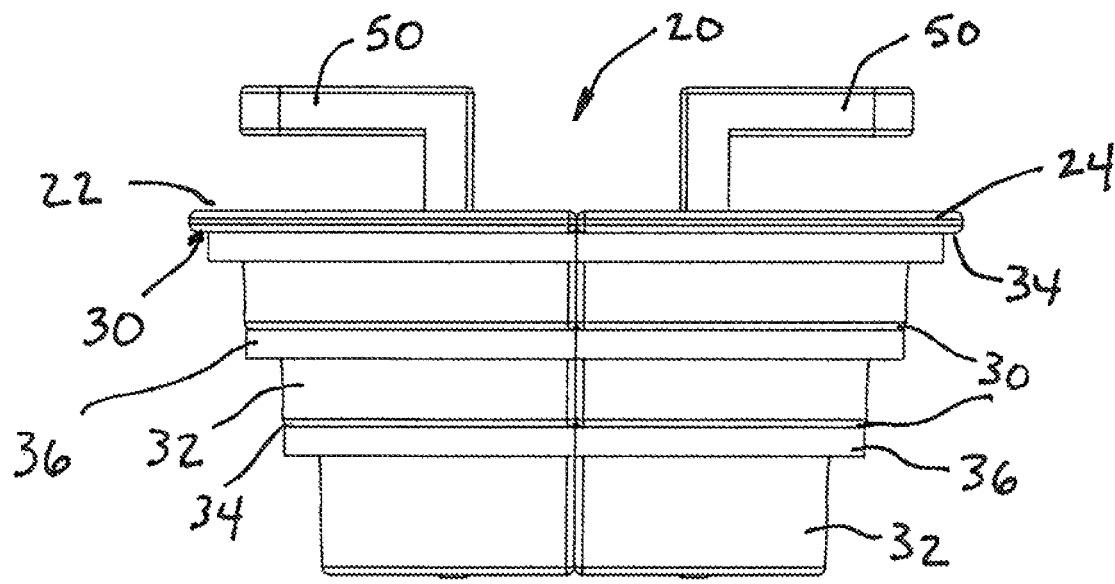
FIG. 2 is a side view of the device of FIG. 1.

Referring to FIGS. 1 and 2, the cap 20 includes a first half 22 and a mated second half 24. The outer side surface 26 of each half includes a plurality of steps 30, with each step 30 including a longitudinal surface 32 and a lateral face or surface 34. The cap 20 illustrated includes three steps, which allows the cap 20 to work with, for example, each of a 3 NPT, a 3.5 NPT and a 4 NPT PVC cleanout Y-fitting. Each lateral surface 34 of the steps 30 preferably includes a rubber gasket 36 which creates a face seal on the outside of the cleanout Y-fitting when engaged with the cleanout Y-fitting (See FIGS. 12 and 14).

Figure 3:
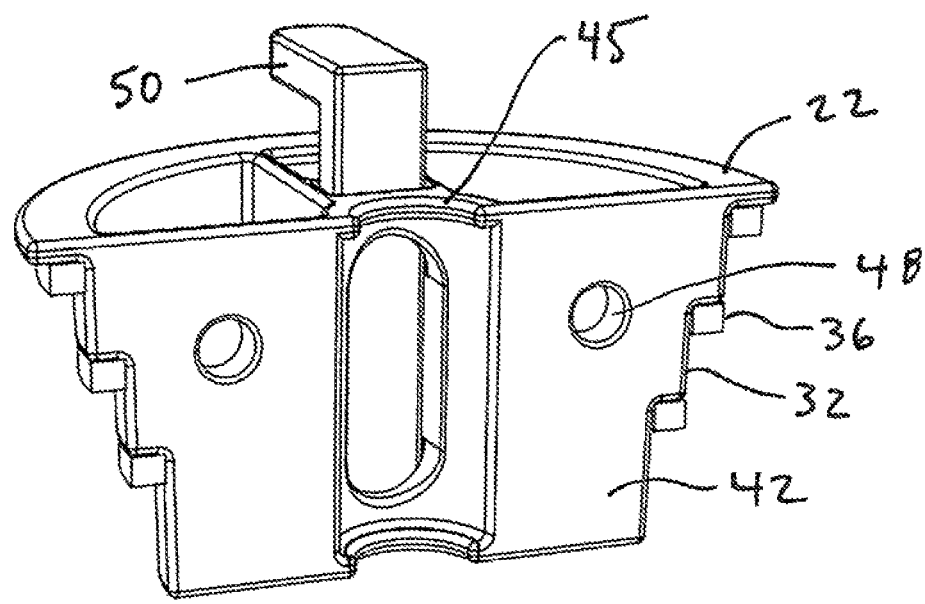
FIG. 3 is a side perspective view of one half of the device of FIG. 1.
Figure 4:
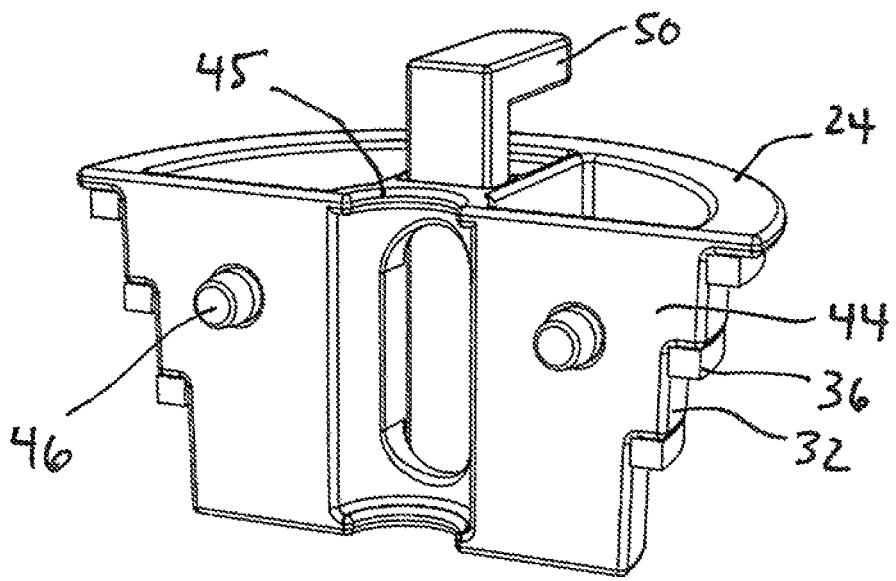
FIG. 4 is a side perspective view of an opposite half of the device of FIG. 1.
Figure 5:
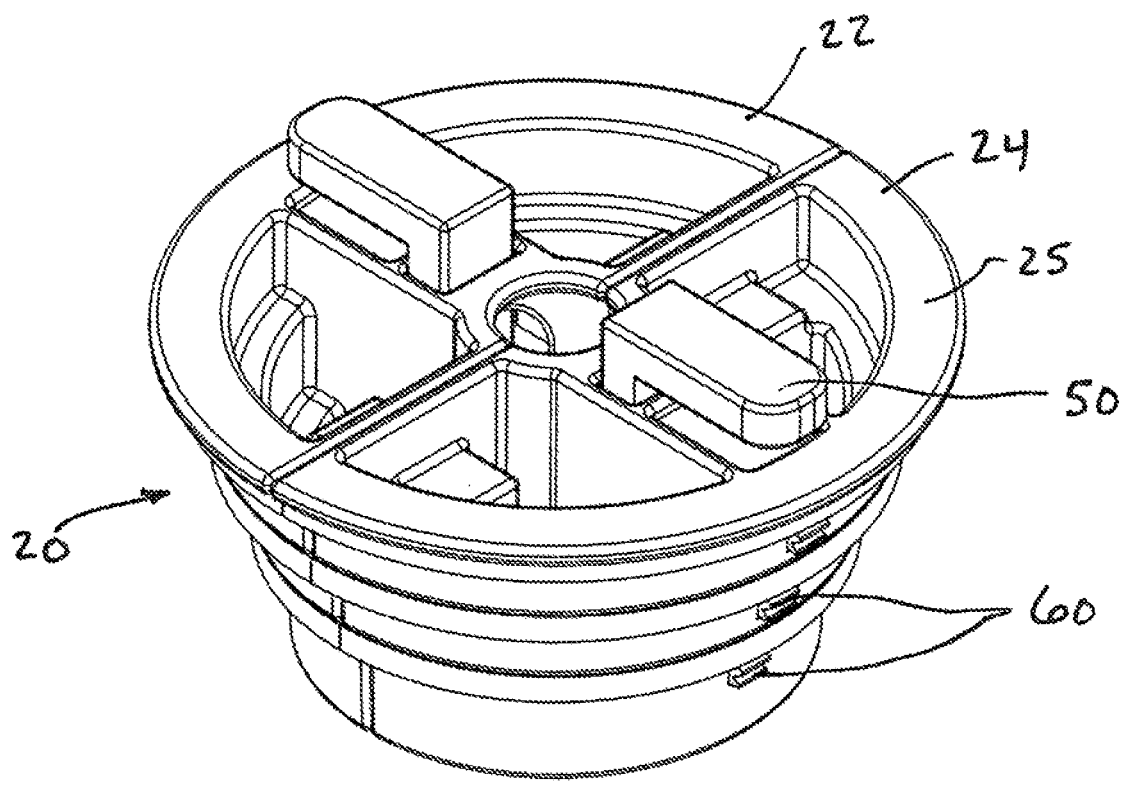
FIG. 5 is the isometric perspective view of FIG. 1 shown in a deployed position.

As shown in FIGS. 3 and 4, each half 22 and 24 includes a mateable face 42 and 44, respectively. Each mateable face 42 and 44 includes a partial cable opening 45 that forms the inner diameter when the halves are combined. The partial cable openings 45 can include a flexible sealing member, such as member 75 in FIGS. 11-14, to seal against various size cables. The mateable face 44 includes pins 46 that correspondingly fit into pin receivers 48 of mateable face 42. To further secure the halves together, the pins 46 and/or receivers 48 can be or include magnets. Alternatively or additionally, one or more of the mateable faces can be magnetized or otherwise include a magnet. As will be appreciated, various sizes, shapes and configurations are available for the pin, magnets, or other connection mechanism between the halves. For example, a screw- or clip-based locking mechanism can be used with or without the pins, and, for example, as a substitute for the magnets.

Figure 6:
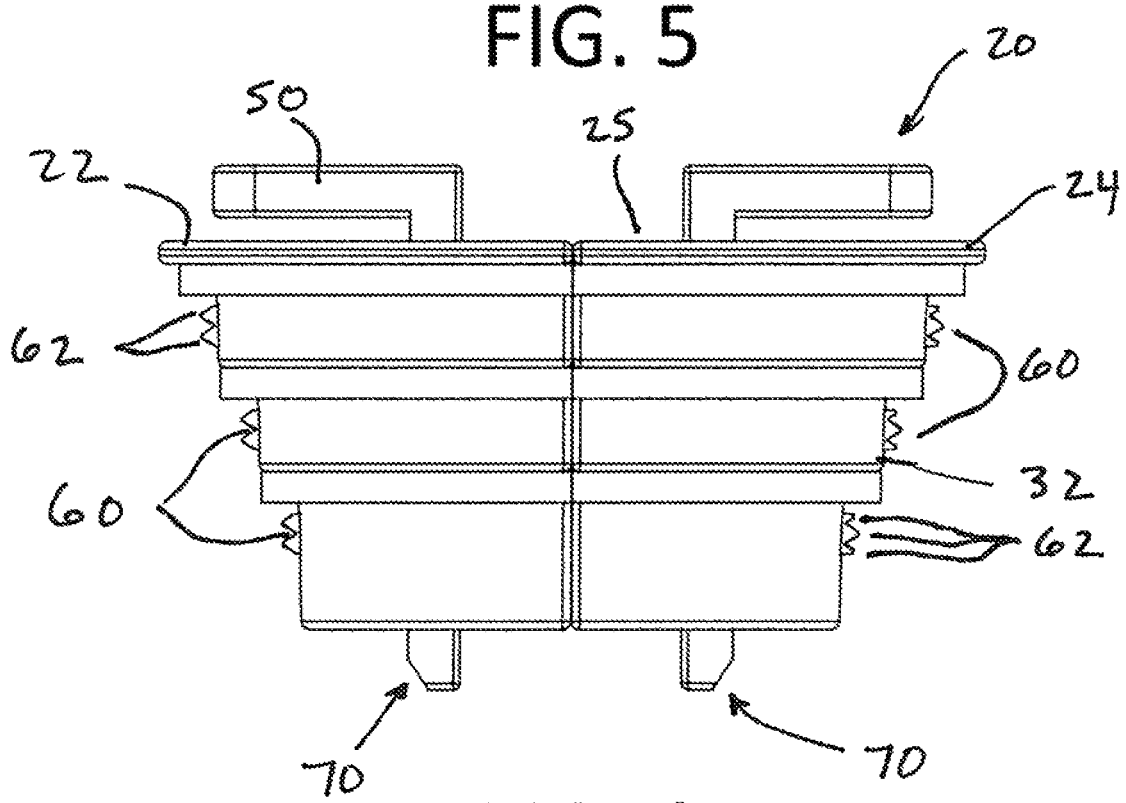
FIG. 6 is a side view of FIG. 1 shown in a deployed position.
Figure 7:
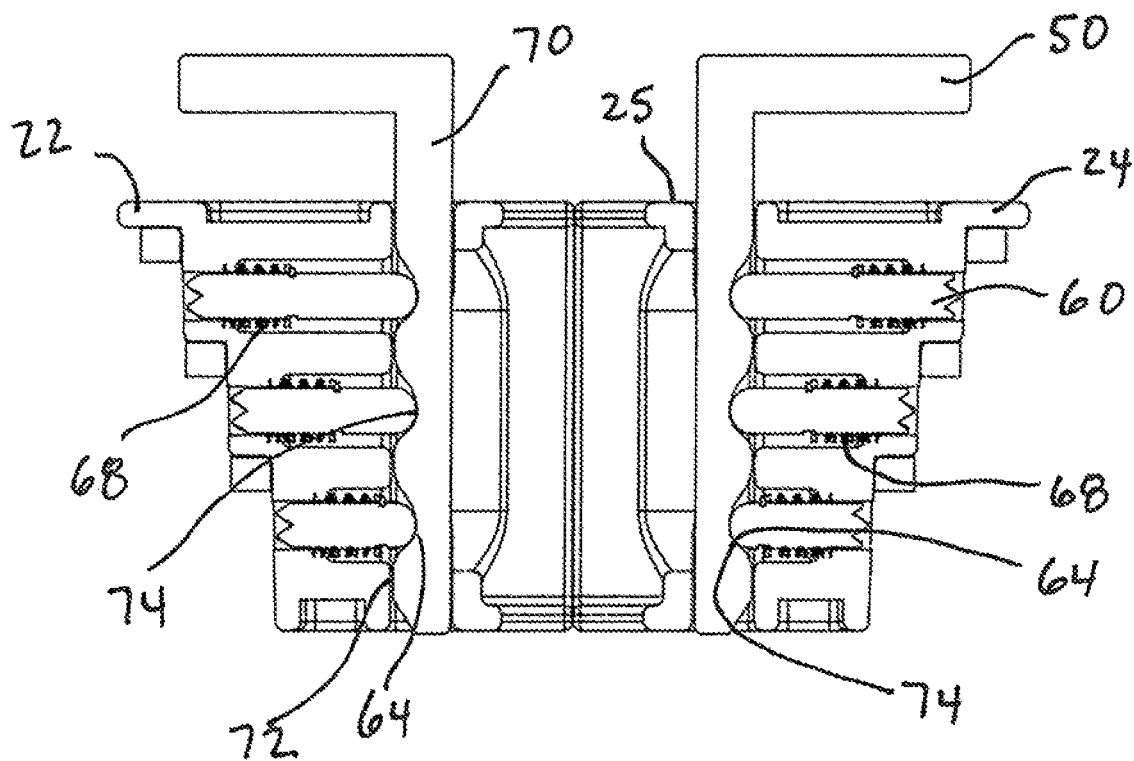
FIG. 7 is the cross-sectional side view of FIG. 1 shown in an undeployed position.
Figure 8:
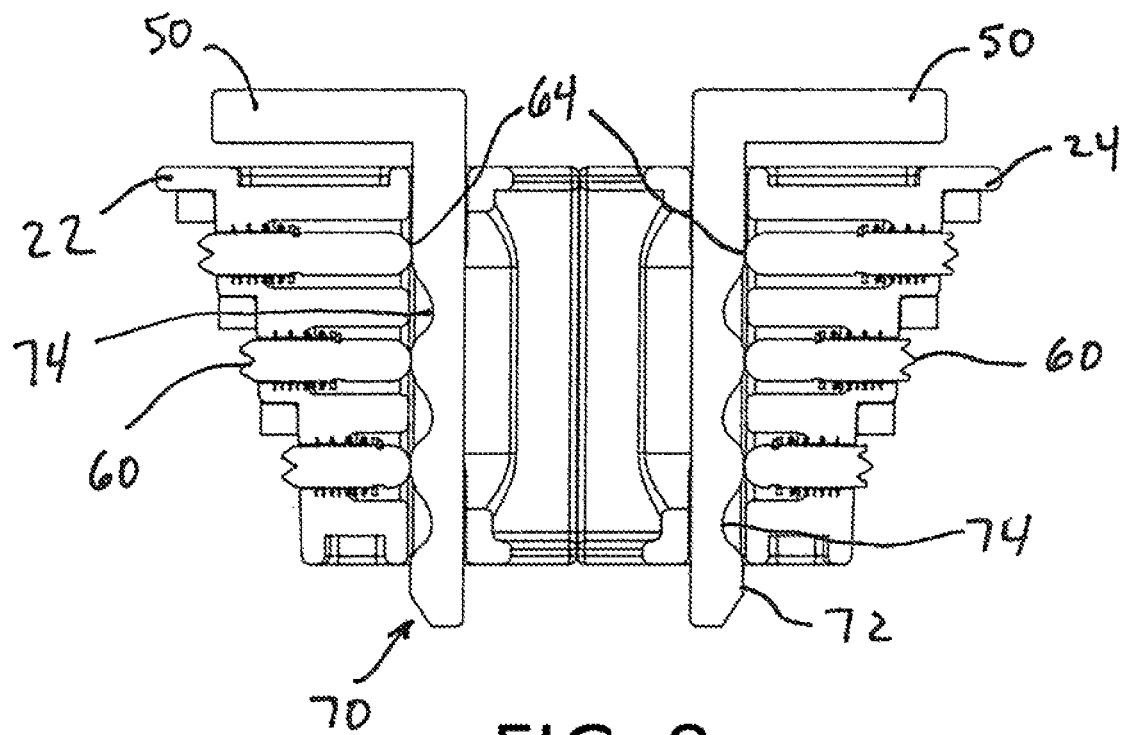
FIG. 8 is a cross-sectional side view of FIG. 1 shown in a deployed position within a pipe.

The plug of this invention has a threaded or equivalent component, such as on longitudinal step surfaces 32, to engage with the threads of the pipe. In embodiments of this invention, the plug includes a locking mechanism which moves a portion of the two engageable plug halves into physical engagement with threads of the pipe. In the illustrated embodiments, as seen in FIGS. 5-8, the locking mechanism of each plug half includes a push button 50 that activates three threaded locking pins 60. Each of the locking pins 60 matches the corresponding threads to the step in which it is located. As illustrated in FIGS. 6-8, the threaded locking pins 60 on one half of the device have ends extendable from the outer surface 26 that include three threads 62 that engage with the female threads of the corresponding cleanout Y-fitting, whereas the threaded locking pins 60 on the other half of the device preferably include two threads 62 that engage with the female threads on the opposite side of the corresponding cleanout Y-fitting.

Figure 9:
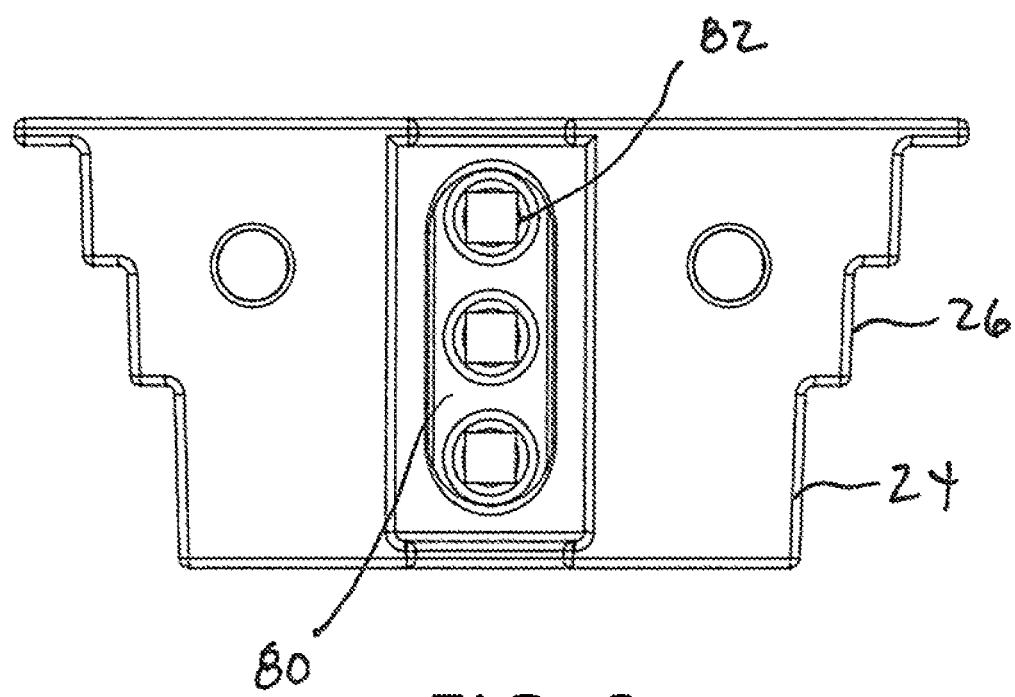
FIG. 9 is a side perspective view of one half of a device without internal components according to one preferred embodiment of this invention.
Figure 10:
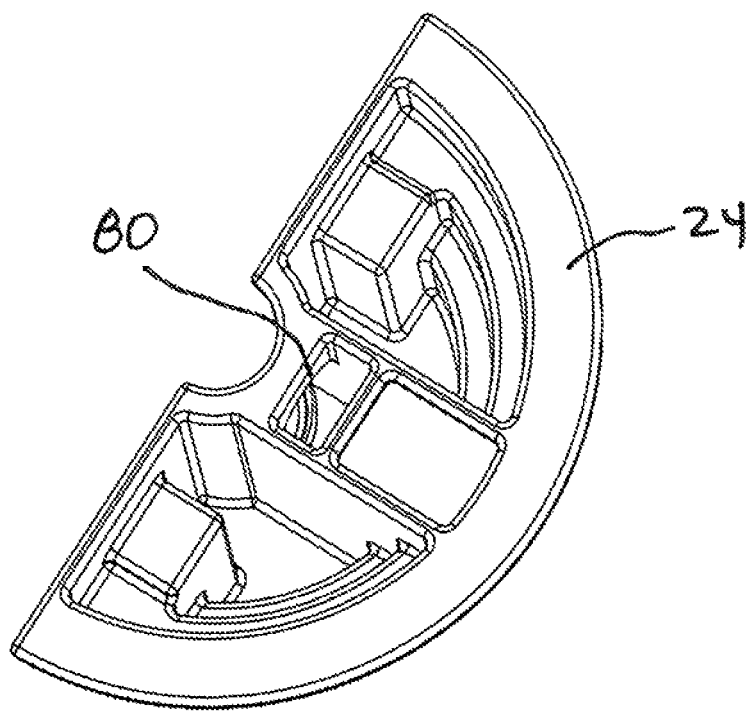
FIG. 10 is a top perspective view of FIG. 9.
Figure 11:
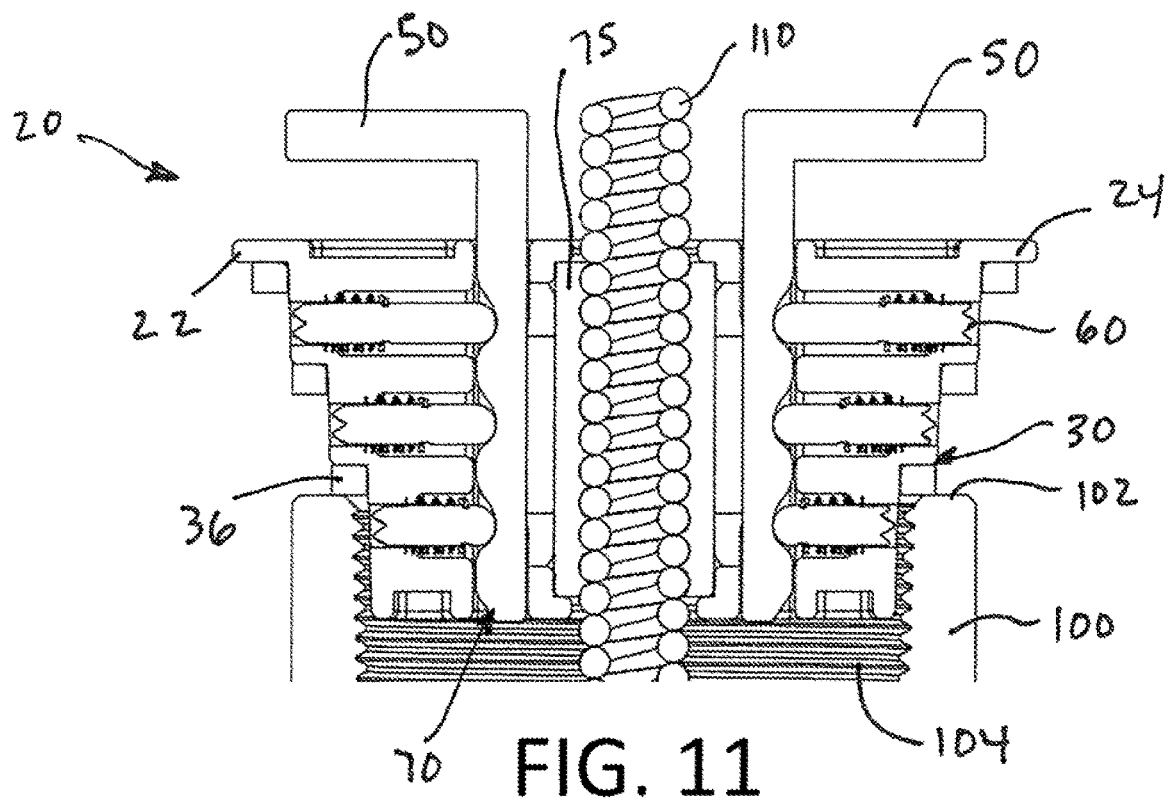
FIG. 11 is a cross-sectional side view of the device of FIG. 1 within a pipe.
Figure 12:
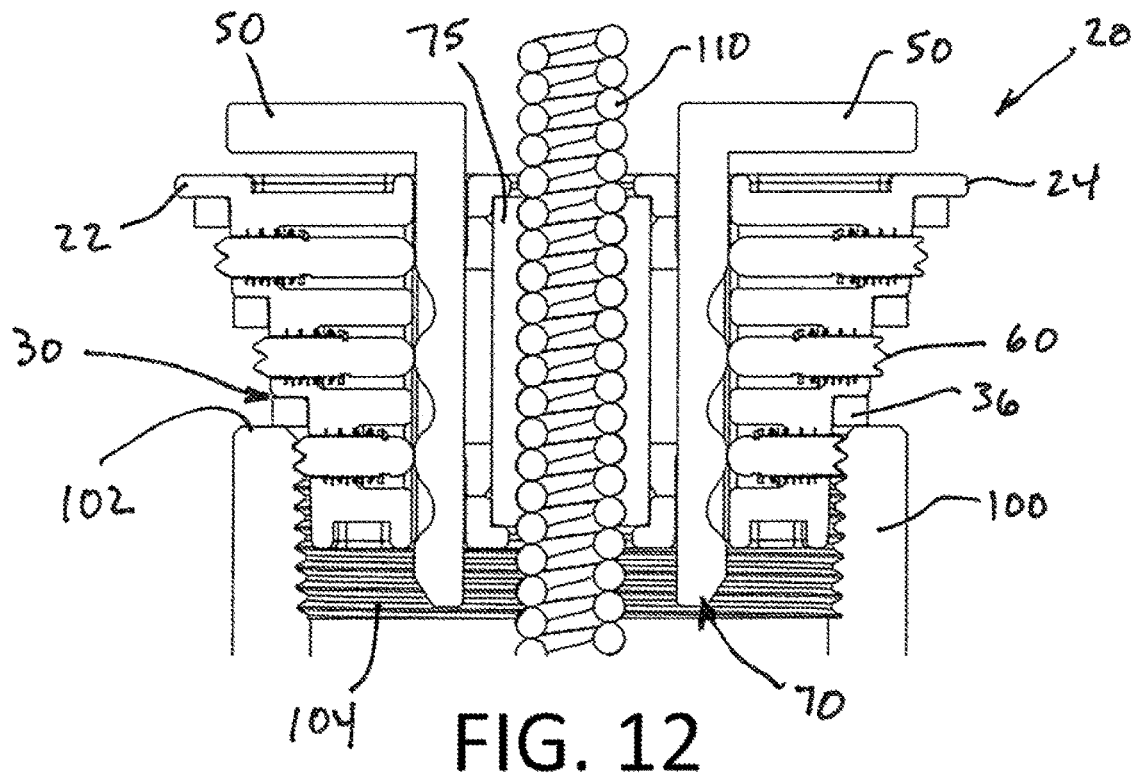
FIG. 12 is a cross-sectional side view of FIG. 11 shown within a pipe in a deployed position.
Figure 13:
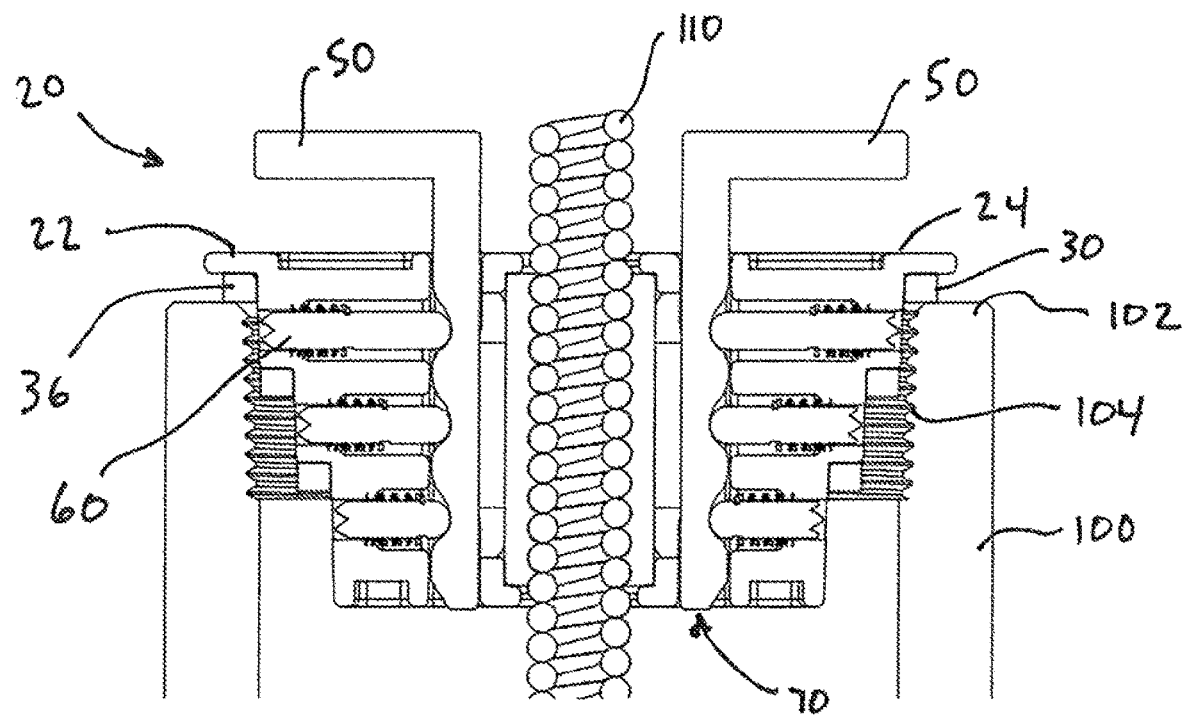
FIG. 13 is a cross-sectional side view of a device within a pipe having a larger diameter than the pipe shown in FIG. 11, according to one preferred embodiment of this invention.
Figure 14:
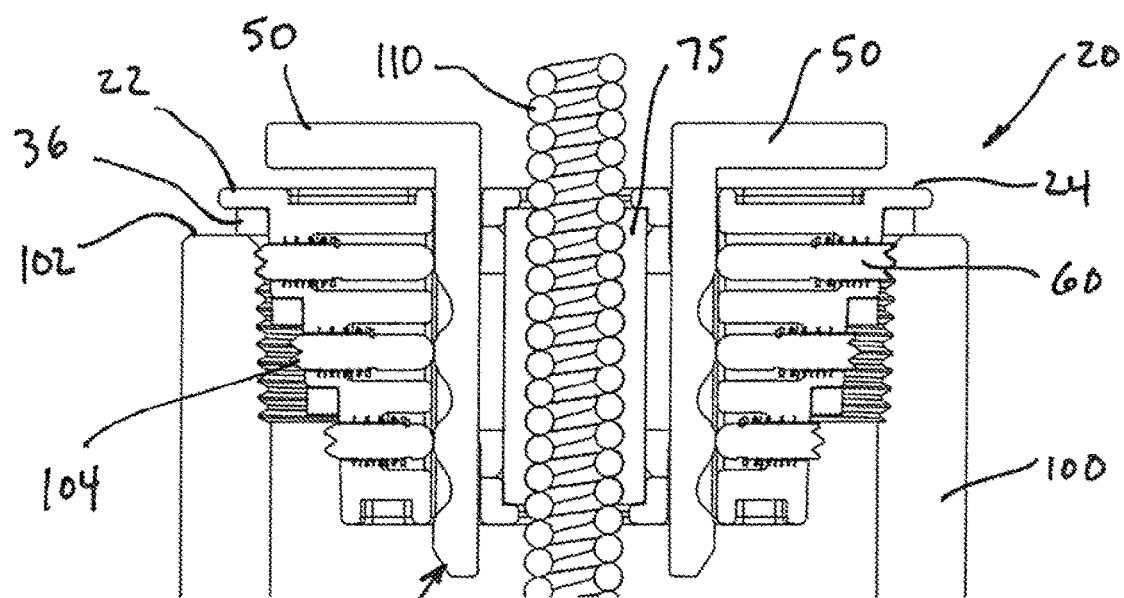
FIG. 14 is a cross-sectional side view of FIG. 13 shown within a pipe in a deployed position.

As illustrated in FIGS. 7 and 8, the locking mechanism of each plug half 22 and 24 includes a push button 50 extending outward from a top end 25 of the plug 20. The push button 50 includes, or is otherwise connected to a cam mechanism 70 having a linear cam surface 72. The cam surface 72 includes three recessions or indentations 74, each receiving an end 64 of the corresponding locking pin 60. As shown in FIG. 7, the ends 64 and indentations 74 are correspondingly curved, such that when the button 50 is pushed inward, the cam surface 72 moves and the curved surface of the indentations 74 force the locking pins outward as shown in FIG. 8 to engage the pipe thread. The locking pins 60 can include a bias member, for example, a spring 68, to keep the locking pins 60 biased toward the cam surface 72. FIGS. 9 and 10 show a plug half 24 without a push button. The plug half 24 includes a button slot 80 for the push button 50 and cam mechanism 70, and three pin passages 82 for the locking pins 60 and springs 68 extending from the button slot 80 to, and open at, the outer surface 26.

The device is used by fitting the two halves of the device around the cable and locking the two halves together with the metal pins and magnets, with the sealing material engaging the cable and creating a seal around the cable. As shown in FIGS. 11-14, the device 20 is mated around cable 110 and then pressed into the pipe 100, for example, a cleanout Y-fitting, until the gasket 36 on the step 30 corresponding to the cleanout Y-fitting size is engaged on the outer face 102 of the pipe 100 (compare FIGS. 12 and 14). The push button 50 is then engaged which directs the threaded locking pins 60 into the threads 104 of the pipe 100, locking the device 20 in place. The seal 75 around the cable 110 combined with the face seal provided by the gasket 36 results in little or inconsequential leakage when the device 20 is locked in place. Thus the invention provides an improved safety plug that is easily deployed in the field, and flexible for use in a number of different size pipe opening.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A safety plug for a pipe comprising:
    two engageable plug halves having a mateable face to seal around a cable and a plurality of steps corresponding with different pipe sizes for engagement within the pipe, wherein the mateable face of a first of the two engageable plug halves includes a pin that mates with a pin receiver on the mateable face of a second of the two engageable plug halves; and
    a locking mechanism which moves a portion of the two engageable plug halves into physical engagement with threads of the pipe.

2. The safety plug of claim 1, wherein each of the two engageable plug halves comprise a partial cable opening configured to receive part of the cable.

3. The safety plug of claim 2, wherein each partial cable opening comprises a sealing member therein.

4. The safety plug of claim 1, wherein each of the plurality of steps comprises a sealing member.

5. The safety plug of claim 1, wherein each of the plurality of steps comprises a locking pin moveable by the locking mechanism.

6. The safety plug of claim 1, wherein the locking mechanism comprises a push button that extends locking pins from each of the plurality of steps.

7. The safety plug of claim 6, wherein the push button extends and moves parallel to the cable and perpendicular to the locking pins.

8. The safety plug of claim 6, wherein the push button includes a cam surface in combination with the locking pins, the cam surface including indentations each receiving an end of a corresponding locking pin in a first, nonextended position.

9. A safety plug for a pipe comprising two engageable plug halves, each including:
    an inner surface with a mateable face to seal around a cable;

an outer surface including a plurality of steps each corresponding with a different pipe size for engagement within a corresponding pipe; and a locking mechanism including an extendable locking pin in combination with each of the plurality of steps, wherein the locking pin moves into physical engagement with threads of the pipe.

10. The safety plug of claim 9, wherein each of the two engageable plug halves comprise a partial cable opening configured to fit together around the cable.

11. The safety plug of claim 10, wherein each partial cable opening comprises a sealing member therein.

12. The safety plug of claim 9, wherein the mateable face of a first of the two engageable plug halves includes a pin that mates with a pin receiver on the mateable face of a second of the two engageable plug halves.

13. The safety plug of claim 12, wherein at least one mateable face comprises a magnet.

14. The safety plug of claim 9, wherein each of the plurality of steps comprises a face seal of a step surface perpendicular to a locking pin surface.

15. The safety plug of claim 9, wherein the locking mechanism comprises a push button that extends the locking pin from each of the plurality of steps.

16. The safety plug of claim 9, wherein the push button extends and moves parallel to the cable and perpendicular to the locking pins.

17. The safety plug of claim 16, wherein the push button includes a cam surface in combination with the locking pins, the cam surface including indentations each receiving an end of a corresponding locking pin in a first, nonextended position.

18. A safety plug for a pipe comprising:

two engageable plug halves having a mateable face to seal around a cable and a plurality of steps corresponding with different pipe sizes for engagement within the pipe; and a locking mechanism which moves a portion of the two engageable plug halves into physical engagement with threads of the pipe, wherein each of the plurality of steps comprises a locking pin moveable by the locking mechanism.

19. The safety plug of claim 18, wherein the mateable face of a first of the two engageable plug halves includes a pin that mates with a pin receiver on the mateable face of a second of the two engageable plug halves.

20. The safety plug of claim 19, wherein at least one mateable face comprises a magnet.

21. The safety plug of claim 18, wherein each of the two engageable plug halves comprise a partial cable opening configured to receive part of the cable.

22. The safety plug of claim 21, wherein each partial cable opening comprises a sealing member therein.

* * * * *